S. P. CAREY.
PROPELLING ATTACHMENT FOR MOTOR VEHICLES.
APPLICATION FILED MAR. 3, 1913.
1,100,119.
Patented June 16, 1914.
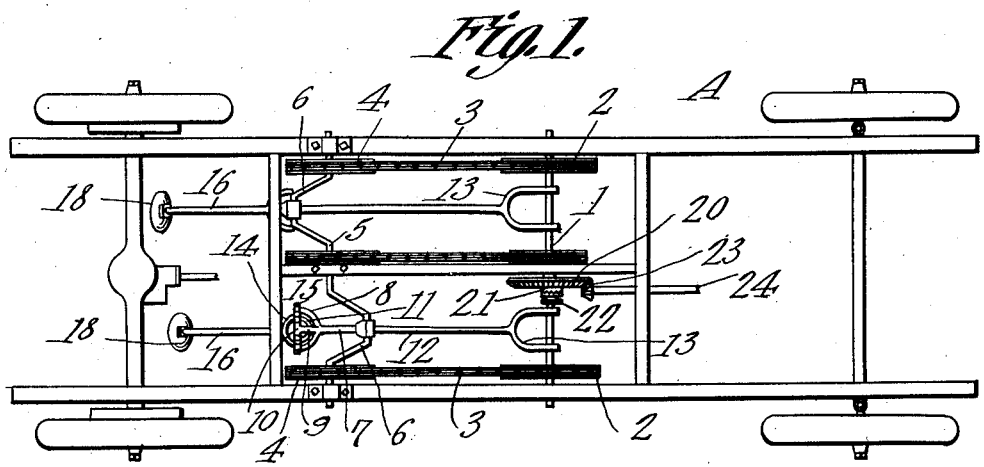
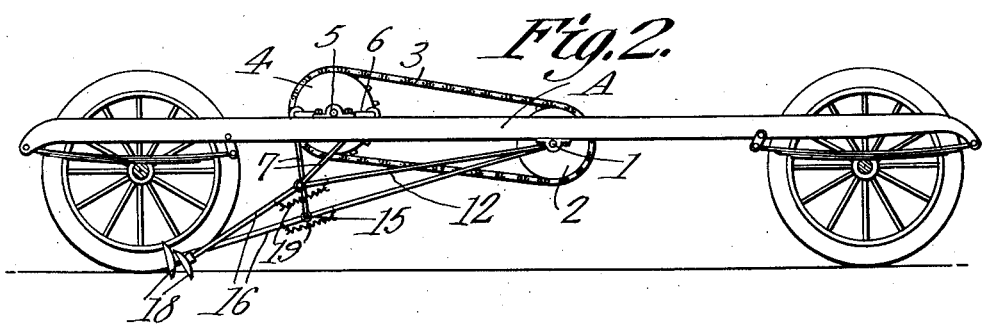
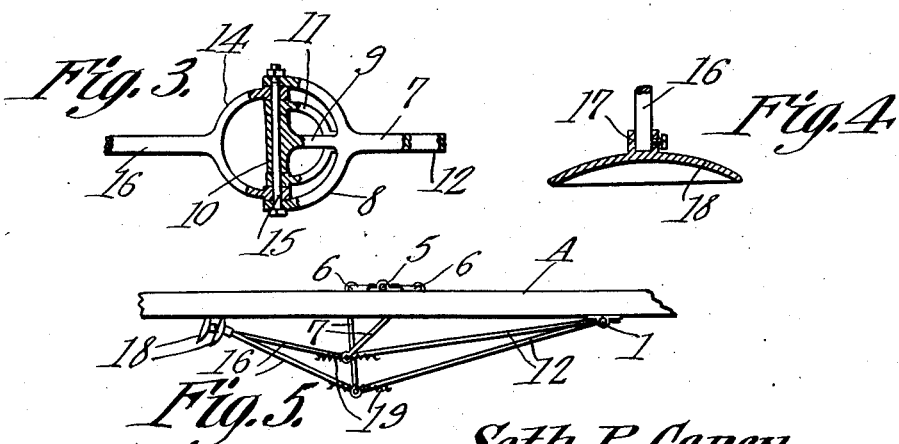
Witnesses
Seth P. Carey,
Inventor
by
Attorneys

UNITED STATES PATENT OFFICE.

SETH P. CAREY, OF PULLMAN, NEBRASKA.

PROPELLING ATTACHMENT FOR MOTOR-VEHICLES.

1,100,119.  Specification of Letters Patent.  Patented June 16, 1914.

Application filed March 3, 1913. Serial No. 751,903.

*To all whom it may concern:*

Be it known that I, SETH P. CAREY, a citizen of the United States, residing at Pullman, in the county of Cherry and State of Nebraska, have invented a new and useful Propelling Attachment for Motor-Vehicles, of which the following is a specification.

This invention relates to propelling attachments for motor driven vehicles.

It is well known that ordinary motor propelled vehicles are practically useless on sandy soil for the reason that they sink thereinto to such an extent as to require the application of some external force to extricate them. For this reason the use of motor vehicles in some localities has been attended with so much annoyance that the general adoption of motor vehicles for pleasure and commercial purposes has been retarded.

It might be stated that in some localities, as, for example, what is known as the sand hills country of Nebraska, practically every hill is of sand, and as most of the residents of this locality are located anywhere from twenty to fifty miles from a railroad, it has always been deemed desirable to use motor vehicles as a means of transportation. It has been found, however, that these vehicles have been unsatisfactory for the reason that it has been practically impossible to drive them over the hills encountered.

One of the objects of the present invention is to provide a propelling attachment to be placed on motor vehicles and used in addition to the ordinary propelling means, the mechanism of this attachment only being brought into play when the vehicle is to be propelled over sandy surfaces such as referred to.

A further object is to provide propelling mechanism which is simple in construction, can be readily applied, and requiring the minimum power for actuating it.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a plan view of a portion of a motor vehicle having the present improvements combined therewith. Fig. 2 is a side elevation of the parts shown in Fig. 1. Fig. 3 is an enlarged view partly in plan and partly in section of the joint between the actuating pitman and the pivotally connected arms. Fig. 4 is a section through one of the shoes. Fig. 5 is a side elevation of a portion of the mechanism and showing the relative positions of the parts when the shoes are lifted out of active positions.

Referring to the figures by characters of reference A designates a portion of a motor vehicle which can be of any desired construction.

The attachment constituting the present invention is designed to supplement the ordinary propelling means and is so formed as to be easily applied to motor vehicles already in use. This attachment includes a shaft 1 extending transversely of the vehicle and to which sprockets 2 are secured. These sprockets transmit motion through chains 3 to additional sprockets 4 secured to the end portions of a shaft 5 which extends transversely of the vehicle and has oppositely disposed cranks 6. A pitman 7 extends downwardly from each crank and each pitman is provided, at its lower end, with a yoke 8 and a central stem 9, there being a bearing sleeve 10 at the free end of the stem and alining with the ends of the yoke. The sleeve 10 is straddled by a yoke 11 formed at one end of an arm 12 which is preferably formed with a yoke 13 pivotally engaging the shaft 1. Another yoke 14 extends into the yoke 8 and has its terminals interposed between the terminals of the yoke 8 and between the terminals of the yoke 11, there being a pivot bolt 15 extending through the terminals of the yokes 8, 11 and 14 and also through the bearing sleeve 10 so that the three yokes are thus held pivotally connected and against lateral oscillation relative to each other. Yoke 14 is formed at one end of an arm 16, the free end of this arm being seated in a socket 17 formed at the center of a concavo-convex shoe 18. A spring 19 connects each arm 12 with the arm 16 extending therefrom.

A gear 20 may be loosely mounted on shaft 1, this gear having a clutch member 21 revoluble therewith and adapted to be engaged by another clutch member 22 which is feathered on the shaft 1. This clutch member 22 can be shifted in any suitable manner and it will be understood that when the two clutch members 21 and 22 are in engagement with each other, the gear 20 will be coupled to shaft 1. Gear 20 may be rotated by means of a gear 23 secured to a shaft 24 and this shaft may be driven in any suitable manner from the motor of the vehicle.

Although chains and sprockets have been shown for transmitting motion from one shaft to the other of the attachment, it is to be understood that any other suitable form of power transmitting mechanism may be utilized.

The arms 16 can be held up out of active positions in any suitable manner. In the construction shown the springs 19 are so disposed that when arms 16 are swung upwardly past their dead centers, the springs 19 will hold them pressed upwardly against the chassis of the vehicle A as will be seen from referring to Fig. 5. Thus, if the gear 20 is uncoupled from shaft 1, the machine can be propelled forward as ordinarily. Should the machine reach a sandy hill or other surface over which it becomes practically impossible to propel it in the usual manner, the arms 16 are swung downwardly to active positions so that their shoes 18 will come into contact with the ground. The gear 20 is then coupled to shaft 1 and said shaft will be rotated so as to cause motion to be transmitted therefrom to the crank shaft 5. Thus the pitmen 7 will be reciprocated upwardly and downwardly, each pitman, during its upward movement, pulling on the pivotal connection between the arms 12 and 16 thereof and thus causing the shoe on said arm 16 to drag forwardly, this movement being facilitated by the spring 19. When the pitman 7 is pushed downwardly, the shoe 18, which is in engagement with the soil, will be anchored and, therefore, as the arms 12 and 16 are brought into alinement, they act as a toggle to push the vehicle forward. As the two sets of arms work alternately it will be seen that a practically continuous forward movement of the vehicle will be produced during the operation of this propelling attachment.

It has been found by actual practice that propelling mechanism such as herein described exerts both a lifting and forward propelling action which will carry the vehicle over any sandy surface on which it may be mounted.

Importance is attached to the particular form of toggle drive described and illustrated inasmuch as this produces a greater propelling force than could be obtained in any other manner as, for example, through the direct application of power from the crank shaft through a single arm against the ground.

What is claimed is:—

1. A propelling attachment for motor vehicles including pivotally connected arms, means for pivotally connecting one end of one of the arms to a motor vehicle, said arm being constantly inclined downwardly and rearwardly from its point of connection to the vehicle, a ground engaging element at the free end of the other arm, a crank mounted for rotation, and a pitman connection between the crank and the pivotally connected ends of the arms for shifting the arms into and out of alinement to thereby exert an intermittent forward thrust against the vehicle to which they are connected.

2. A propelling attachment for motor vehicles, including pivotally connected arms, means for pivotally connecting one end of one of the arms to a motor vehicle, said arm being constantly inclined downwardly and rearwardly from its point of connection with the vehicle, a ground engaging shoe at the free end of the other arm, means connected to the pivotally connected ends of the arms for oscillating the arms to move the arms into and out of alinement thereby to intermittently exert a forward thrust against the vehicle to which they are connected, and yielding means for holding the arms normally out of alinement.

3. A propelling attachment for motor vehicles, including pivotally connected arms, means for pivotally connecting one end of one of the arms to a motor vehicle, a ground engaging shoe at the free end of the other arm, means connected to the pivotally connected ends of the arms for oscillating the arms, and yielding means for holding the shoe in either raised or lowered position and with the arms out of alinement.

4. The combination with a motor vehicle, of an attachment including a transverse shaft, a crank shaft, pitmen depending from the cranks of the shaft, arms pivotally mounted on the first named shaft, means for transmitting motion from one shaft to the other, shoe carrying arms pivotally connected to the first mentioned arms, said pitmen being connected to the arms where they are pivotally connected to each other, and yielding means connecting the pivoted arms for holding the shoes either in or out of contact with the soil.

5. A propelling attachment for motor vehicles, including pivotally connected arms, means for pivotally connecting one of the arms to a motor vehicle, means upon the other arm for engaging the surface on which the vehicle is mounted, a spring connected to the arms and constituting means for holding said arms in either of two positions relative to each other, and means connected to the arms for shifting them successively into and out of alinement.

6. The combination with a motor vehicle, of an upper arm pivotally connected at one end to the motor vehicle, a lower arm, said arms being pivotally connected, a soil engaging shoe carried by the lower arm, a spring connecting the arms for holding said lower arm normally inclined either downwardly or upwardly relative to the upper arm, a crank shaft, and a pitman connection between the crank shaft and the arms for moving said arms successively into and out of alinement while the shoe is in engagement with the soil.

In testimony that I claim the foregoing as my own, I have hereto affixed my signature in the presence of two witnesses.

SETH P. CAREY.

Witnesses:
JACK C. BRISTOWE,
J. E. LOME.

Copies of this patent may be obtained for five cents each, by addressing the "Commissioner of Patents, Washington, D. C."